United States Patent
Sagady et al.

[11] Patent Number: 6,052,453
[45] Date of Patent: Apr. 18, 2000

[54] COIN OPERATED TELEPHONE AUDITOR

[75] Inventors: Cary M. Sagady, Chester Springs; Robert C. Lamb, Jr., Springfield, both of Pa.; Michael S. Zemanik, Mullica Hill, N.J.

[73] Assignee: Mars Incorporated, McLean, Va.

[21] Appl. No.: 09/127,645

[22] Filed: Jul. 31, 1998

Related U.S. Application Data

[62] Division of application No. 08/681,844, Jul. 29, 1996.

[51] Int. Cl.$^7$ .......................... H04M 17/00; H04M 11/00
[52] U.S. Cl. ............................. 379/146; 379/27; 379/155
[58] Field of Search .................................. 379/145, 155, 379/322, 323, 324, 1, 24, 26, 27, 30, 32, 34, 146

[56] References Cited

U.S. PATENT DOCUMENTS

| | | | |
|---|---|---|---|
| Re. 30,973 | 6/1982 | Zarouni . | |
| 3,213,210 | 10/1965 | Samples . | |
| 4,123,623 | 10/1978 | McElliott | 379/147 |
| 4,208,549 | 6/1980 | Polillo et al. . | |
| 4,220,825 | 9/1980 | Fahey . | |
| 4,513,179 | 4/1985 | Phillips et al. | 379/26 |
| 4,567,325 | 1/1986 | Crouch et al. . | |
| 4,599,492 | 7/1986 | Otten . | |
| 4,625,078 | 11/1986 | Crouch et al. | 379/145 |
| 4,731,829 | 3/1988 | Bonnet et al. | 379/382 |
| 4,734,933 | 3/1988 | Barsellotti et al. | 379/164 |
| 4,742,538 | 5/1988 | Szlam | 379/361 |
| 4,756,017 | 7/1988 | Bush | 379/23 |
| 4,777,647 | 10/1988 | Smith et al. | 379/151 |
| 4,842,120 | 6/1989 | Dobbins et al. | 194/349 |
| 4,852,145 | 7/1989 | Bevers et al. | 379/27 |
| 4,924,497 | 5/1990 | Smith et al. | 379/150 |
| 4,928,299 | 5/1990 | Tansky et al. | 379/147 |
| 4,953,681 | 9/1990 | Zouzoulas | 194/346 |
| 4,955,052 | 9/1990 | Hussain | 379/145 |
| 4,979,208 | 12/1990 | Pruden et al. | 379/145 |
| 5,167,313 | 12/1992 | Dobbins et al. | 194/317 |
| 5,311,582 | 5/1994 | Davenport et al. | 379/143 |
| 5,330,041 | 7/1994 | Dobbins et al. | 194/206 |
| 5,410,590 | 4/1995 | Blood et al. | 379/155 |
| 5,443,144 | 8/1995 | Dobbins et al. | 194/317 |

*Primary Examiner*—Paul Loomis
*Assistant Examiner*—Binh K. Tieu
*Attorney, Agent, or Firm*—Fish & Richardson P.C.

[57] ABSTRACT

A low-power, integrated coin acceptor for a payphone containing audit circuitry is described. The integrated coin acceptor connects to the telephone tip, ring and ground lines and connects to a dumb or smart payphone chassis to provide both coin validation and audit functions. The integrated coin acceptor is compatible with the audit software used by the central office, and assures a seamless transition between coin acceptor operation, audit data recording and audit information transmission. Components related to the audit function include a line interface to the tip, ring, and ground lines, a DTMF transceiver, battery backed-up RAM memory, EEPROM memory, real time clock, and battery and control circuits for data retention. During audit interrogation activity, the integrated coin acceptor takes control of the phone line, but contains circuitry that will return dial-tone to the user if an off-hook event occurs. Also disclosed are an interface circuit to aid in initializing the audit functions and for checking the availability of telephone line power, and a cashbox security switch for mounting into an existing hole in the telephone chassis housing.

12 Claims, 10 Drawing Sheets

COIN OPERATED TELEPHONE AUDITOR

This is a divisional application of copending U.S. application Ser. No. 08/681,844 filed on Jul. 29, 1996.

BACKGROUND OF THE INVENTION

The present invention pertains to an integrated electronic coin acceptor and auditor for a coin operated telephone. The integrated coin acceptor validates coins, monitors money collection events at the coin telephone and transmits information to a central location.

Coin operated telephone stations are interfaced with a central office by tip, ring and ground lines. When the handset is lifted off the hook, the central office supplies a very small DC loop current, 23 milliamperes (mA) minimum, which is available to the coin operated telephone for use as a source of power. When the handset is on-hook, the recommended practice is for a coin operated telephone to draw virtually no current from the phone line.

The deregulation of the telephone industry forced payphone manufacturers to incorporate a number of cost-saving electronic functions and features into their coin telephones. These new devices are known as "smart" payphones because they incorporate a chassis containing computerized circuitry to perform a multiplicity of functions not performed by regular or "dumb" payphone units. One of the functions typically included is the monitoring, counting and recording of all cash transactions.

Several approaches have been used to address the demand for additional payphone functions and features within the constraints of low power operation. In some cases, an internal battery is used to supply additional power. Other coin operated telephones have simply not incorporated a full range of advanced functions. Yet other prior art coin telephones draw several milliamps of current when the handset is on-hook to power various functions, thus violating the recommended practice and robbing power from other payphones attached to the system.

The operation and maintenance of coin-operated telephones is expensive. One factor that contributes to this expense is the cost to collect the money from the coin telephones, which typically differs from telephone to telephone since it can depend greatly on the telephone's location. Any measures that can be taken to reduce the frequency with which the collections must be made can contribute significantly to the profitability of operating coin telephones.

One way to reduce the cost of removing the receipts from a particular coin telephone is to minimize the collection frequency. However, reducing collection frequency beyond a certain point results in lost receipts, since the telephone cannot be operated once the collection box is full. Furthermore, since the rate at which a given telephone becomes filled with coins can vary significantly from time to time, a time duration that is adequate between collection visits at one time may be too long at another time and may result in an unnecessary visit at a third time.

The most desired function offered by the smart payphone units is their ability to accurately count and make available a record of all deposited and collected coinage. The auditors keep track of the amount of money collected and send the collection information to a central location which utilizes the information to schedule collections. Some systems include equipment and software at the central location to poll the remote auditors at predetermined time intervals. In other systems, each coin telephone auditor transmits audit information whenever a user places a call. Several Regional Bell Operating Companies (RBOC's) have invested in systems that use collection prediction software, such as "PDAS", to provide data management of coin collections. The ability to accurately monitor coin collections enables telephone companies to minimize or avoid the substantial economic losses experienced as a result of skimming and the like.

There are many types of telephone auditors, but all of them suffer from one or more of several drawbacks. For example, some prior art auditors require extra communication lines to carry the information, while others require additional power connections. In addition, many prior art stand-alone auditors require substantial modifications to existing coin telephones to enable the audit information to be recorded when a user makes a call. Further, the prior art auditors transmit information while the handset is on-hook, and when a user picks up the handset, there is no dial tone and thus the user is prevented from making a call.

Furthermore, while smart payphones including audit functions provide advantages not provided by older, dumb payphones, their adoption and use presents many problems. For example, many smart payphone units are not as strong, durable and trouble-free as the dumb payphone units they are designed to replace. In addition, the electronic chassis used in the smart payphone is many times more costly to manufacture, install and maintain than a dumb chassis. Further, special skills are required to install, maintain and service smart payphones that are not comparable to the skills required and currently exercised by service personnel who maintain dumb payphone units. Yet further, some smart payphone units are more complicated to use, sometimes causing customer dissatisfaction, whereas the dumb sets, as a result of their long usage, are familiar and user-friendly. Most importantly, the RBOC's have a substantial capital investment in standard or dumb payphones in use today, and therefore wish to extend their potential life expectancy for a number of years. Many of the RBOC's cannot justify abandoning their standard, dumb payphones to adopt and use more costly, yet to be paid for, smart telephones.

Thus, the incorporation of a simple and inexpensive coin auditor into a dumb-chassis of a payphone is highly desirable. It also is desirable to provide a simple, inexpensive electronic coin acceptor with audit capability for connection to a dumb set, or to a smart set that may lack audit capability.

SUMMARY OF THE INVENTION

We present a low-cost, electronic, line-powered and low-power integrated coin acceptor that provides audit functions. In general, the integrated coin acceptor contains coin validation and audit circuitry for validating deposited coins, and for monitoring, storing and transmitting audit data. The integrated coin acceptor may be retrofit to a dumb payphone chassis, or may be connected to a smart payphone chassis, only requiring connection to the coin telephone. Further, the integrated coin acceptor requires no modification of central-office equipment, and can be operated by telephone-network power alone.

In one aspect the invention is an integrated coin acceptor having a coin passageway, at least one coin sensor, audit circuitry, telephone chassis interface circuitry and control means. The control means, which may include a microprocessor and associated circuits, is connected to the coin sensor, audit circuitry, and to the interface circuitry. The integrated coin acceptor validates coins, refunds coins, monitors audit events, saves audit data, and transmits audit data to a central office.

A preferred embodiment of the integrated coin acceptor may include the following features. A battery connected to the control means, to the memory means and to the audit circuitry provides power in the event of power loss or when the payphone is on-hook. The audit circuitry includes a DTMF transceiver, RAM memory, EEPROM memory, real time clock, battery control circuit, and a telephone line interface circuit. An indicator means is provided for indicating that adequate power exists on the telephone lines to power the functions of the integrated coin acceptor. An event monitoring switch for installation in the housing of the payphone reports when the vault door is opened or the cashbox removed. The event monitoring switch may comprise a bracket, a collar housing, a mounting means, a plunger switch and a monitor line connected to the audit circuitry. In addition, detection means monitors the telephone line when the handset is on-hook, detects collect or refund operations of the central office, and stores an indication of such occurrence without consuming telephone line power. The detection means may comprise a detection circuit, a collect latch, a refund latch, a control circuit and a battery. Furthermore, an off-hook detection circuit monitors the handset during audit data transmission and generates an open switch interval when the payphone goes off-hook. The off-hook detection circuit operates so that a dial tone will be returned to the user in such a situation. The off-hook detection circuit may also be incorporated into an audit device, and comprises a mechanical relay, an audit relay, a comparator and a control means.

Another aspect of the invention concerns a payphone event monitoring switch for monitoring coin collections. The switch is installed using pre-existing payphone chassis holes, and comprises a bracket, a collar housing, a mounting means, a plunger switch assembly and a monitor line. The event monitoring switch is inexpensive, easy to install, and easy to connect to the audit circuitry.

In another aspect of the invention, a loop length indicator circuit is described for indicating if enough telephone line power is available to enable proper functioning of a coin operated telephone. The indicator circuit may comprise a monitor means, control means and an indicator means. The monitor means may be a voltage detect circuit, and the indicator means may comprise an LED, an audible tone driver, an audible alarm or a combination of such indicators.

In yet another aspect of the invention, a circuit is provided for a payphone for detecting and storing central office collect and refund events when the handset is on-hook. The circuit uses no telephone line power and comprises a detection circuit, a collect latch and a refund latch connected together in a bistable configuration, a control circuit and a battery.

Another aspect of the invention provides a low-power coin acceptor for attachment to a payphone chassis which includes an indicator means for indicating whether or not adequate telephone line power is available to power the payphone. The coin acceptor comprises a coin passageway, at least one coin sensor, control means, monitor means and indicator means. The indicator means may comprise an LED, an audible tone driver, an audible alarm or a combination thereof. The low power coin acceptor may also include audit circuitry.

The invention combines the proven reliability of an electronic coin acceptor with desirable coin accounting, telephone line power indication, and off-hook detection functions. The detection circuitry returns the dial tone to a user when she removes the handset from the hook-switch to go off-hook during audit communications. The detection circuitry also removes power from the payphone keypad to prevent corruption of the audit data. These features help to reduce costs for the payphone owner by accurately accounting for deposited coins, by enabling the optimization of collection schedules, and by ensuring that a user may place a call whenever the payphone handset is taken off-hook. In addition, wiring complexity is reduced by the integrated coin acceptor because there are no direct connections to the telephone chassis hook-switch, which reduces installation time.

Other advantages and features will become apparent from the following detailed description and from the claims.

DETAILED DESCRIPTION

Figure 1:
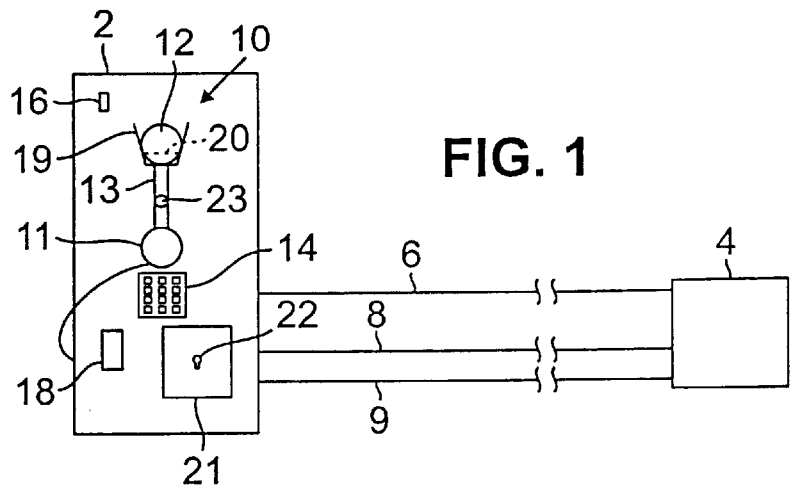
FIG. 1 illustrates a coin-operated telephone connected to a central office.

FIG. 1 shows a typical coin operated telephone or payphone 2 which is connected to a central office 4 by three wires, the phone lines, which are referred to as the tip 6, ring 8 and ground 9 lines. As shown in FIG. 1, phone 2 includes a handset 10 having a mouthpiece 11 and an earpiece 12 which are connected by a handle 13, a keypad 14, a coin slot 16, and a coin return slot 18. When not in use by a customer, the handset 10 sits in a cradle 19 depressing a spring-loaded hook switch 20. When the handset 10 is in the position shown in FIG. 1, switch 20 is in its "on-hook" 20 position. When handset 10 is lifted out of cradle 19, switch 20 is no longer depressed and it is then in its "off-hook" position.

The central office 4 applies various D.C. voltage amplitudes and polarities on the tip 6 and ring 8, from which the phone 2 generates its operational power when the handset 10 is off-hook. The varying DC voltages and an AC ringing voltage are interpreted by the coin telephone 2 as providing operational commands for controlling its operation. When handset 10 is on-hook, the phone 2 draws essentially no power from the tip 6 or ring 8 lines. The phone 2 typically does, however, perform status monitoring in its standby state using a small amount of power from an internal battery.

A customer picks up handset 10 to place a call thereby releasing the switch 20 from its depressed position. The phone 2 enters its off-hook state, and begins to draw power from the tip 6 and ring 8 lines to process the call. Next, the customer inserts a sufficient number of coins into the coin slot 16 to cover the cost of the call and dials the number using keypad 14. The dialed number is transmitted to the central office 4 which connects the call. The customer completes the call by hanging up the phone, and then the money is collected by phone 2 when a collect signal from the central office 4 is received.

Figure 2:
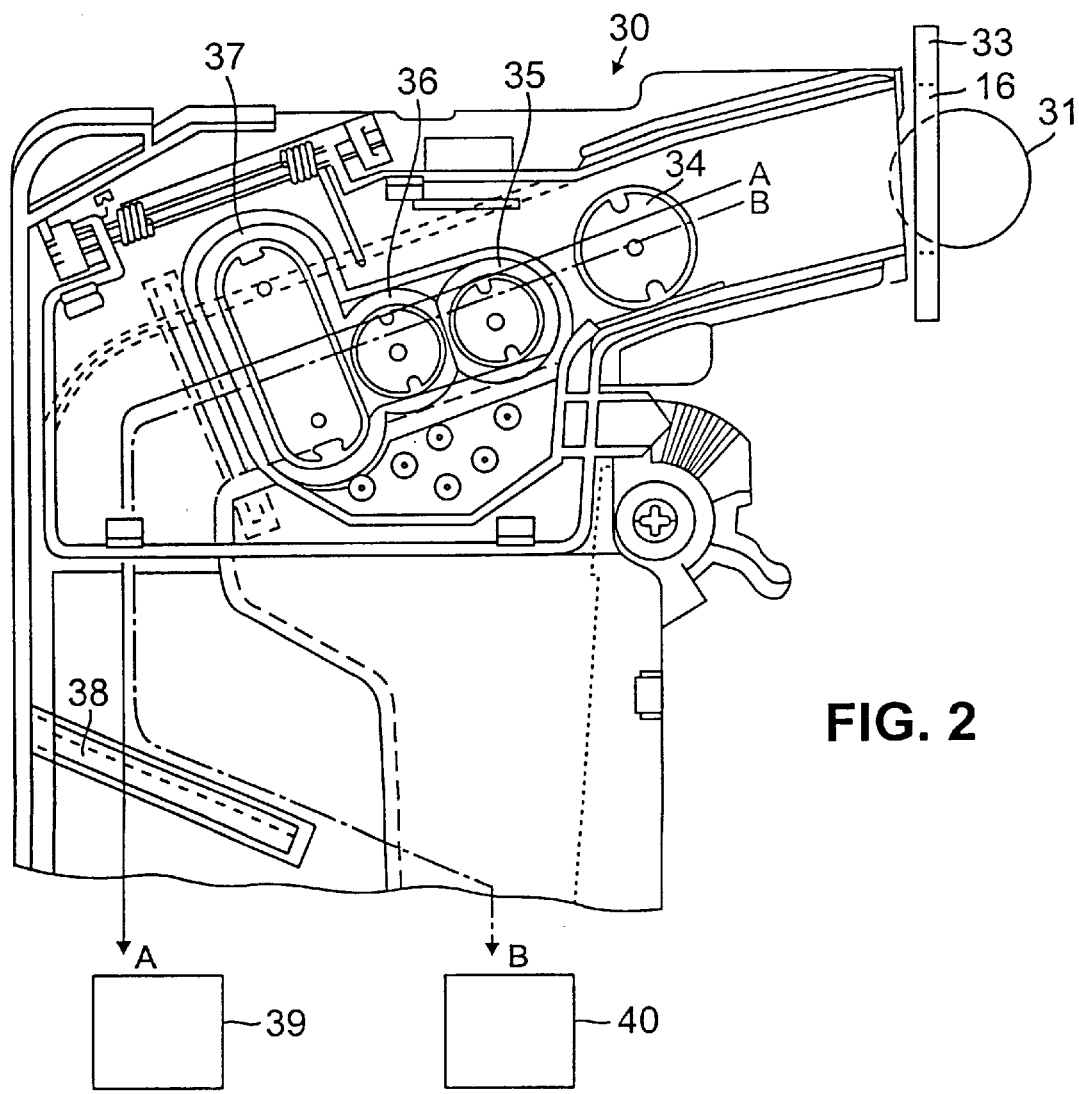
FIG. 2 is a partial cutaway side view of the upper portion of an embodiment of an integrated coin acceptor.

FIG. 2 is a partial cutaway side view of the upper portion of an embodiment of an integrated coin acceptor 30. A customer's coin 31 is shown being inserted through coin slot 16 in front panel 33 of the phone 2. From the slot 16, the coin 31 travels past a plurality of coin detectors and sensors 34, 35, 36 and 37. After the last sensor 37, the coin 31 falls onto a gate 38 which directs the coin 31 either to a coin escrow bucket 39 or to a return chute 40 which directs the coin 31 to the coin return slot 18 (see FIG. 1) where it can be retrieved by the customer. In traveling from slot 16 to the coin escrow bucket 39 or the coin return chute 40, the coin 31 travels along either an accept path A shown as a solid line in FIG. 2, or along the reject path B shown as a dashed line in FIG. 2.

Each of the sensors 34, 35, 36 and 37 produces an electrical output signal which serves as an input to a processing element or microcontroller or microprocessor which determines whether the coin is acceptable and its denomination. The microprocessor also produces output signals for controlling the position of the gate 38 so that the gate 38 either directs the coin along path A or path B. The microprocessor also controls a power supply for energizing the gate 38. Thus, the microprocessor processes the electrical output signals from the sensors 34, 35, 36 and 37, generates gate control signals, and controls the gate power supply. The details concerning microprocessor control of the coin discrimination and validation functions and gate functions are beyond the scope of the present application, but can be found, for example, in U.S. Pat. No. 4,842,120 ("Jam Reducing Apparatus For Use In A Coin Operated Machine"), U.S. Pat. No. 4,953,681 ("Compact, Low Power Gate Apparatus For Coin Operated Machines"), U.S. Pat. No. 4,538,719 ("Electronic Coin Acceptor"), U.S. Pat. No. 5,167,313 ("Apparatus for Improved Coin, Bill and Other Currency Acceptance and Slug or Counterfeit Rejection"), U.S. Pat. No. 5,330,041 ("Apparatus for Improved Coin, Bill and Other Currency Acceptance and Slug or Counterfeit Rejection"), and U.S. Pat. No. 5,443,144 ("Apparatus for Improved Coin, Bill and Other Currency Acceptance and Slug or Counterfeit Rejection"), which are assigned to the assignee of the present invention. Furthermore, additional details of low power control apparatus for a payphone are described in U.S. Patent No. 4,926,458 ("Low Power Control Apparatus For A Coin Operated Telephone"), and U.S. Pat. No. 4,979,208 ("Method And Apparatus For Electronic Payphone Open Switch Interval Management"), both assigned to the assignee of the present invention. The disclosures of these U.S. Patents are incorporated by reference herein.

Figure 3A:
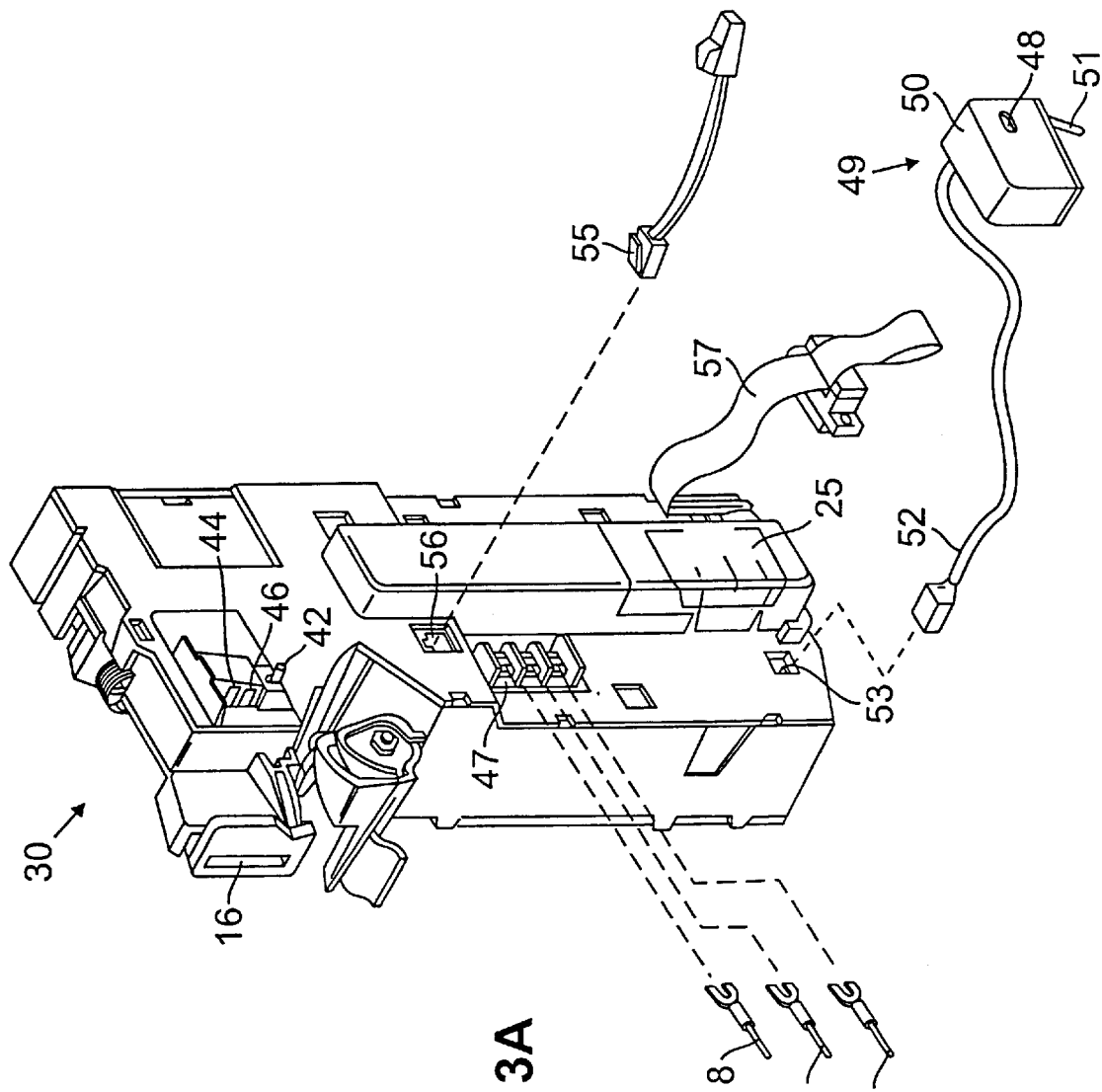
FIG. 3A is a perspective view of the embodiment of an integrated electronic coin acceptor of FIG. 2.

FIG. 3A is a perspective view of the embodiment of an integrated, stand-alone electronic coin acceptor 30 of FIG. 2. The integrated coin acceptor 30 performs coin validation and audit operations, including transmitting audit data to a central office. The device 30 may be installed as original equipment in a payphone, or may be used as a retrofit to an existing dumb payphone chassis, for example, the Western-Electric D-set chassis. Alternately, the integrated coin acceptor may interface with a smart chassis.

Referring to FIG. 3A, the integrated coin acceptor 30 contains a coin slot 16 leading to a coin passageway that contains the coin sensors (see FIG. 2). A test button 42 and two LED's 44, 46 are present on the side of the unit, which are used to initialize the audit function. (The LED's may also be used to provide telephone status information, which is explained below.) A battery cover 25 protects access to a replaceable battery (not shown). The battery is a high-density, long-life battery preferably having at least a 5-year life, and may be size "AA" and rated at 3.6 volts and is used to power certain functions which will be explained below. Connectors 47 accept the tip 6, ring 8 and ground 9 lines. A security switch 49 comprising a collar housing 50 and a plunger 51 is designed to monitor the vault door or the coin box within the payphone chassis, and has a line 52 for connection to a receptacle 53 of the integrated coin acceptor. The security switch 49 is powered from the telephone line or from the replaceable battery. A pig-tail male plug 55 is shown for connection to female connector 56, and is used for connecting the tip, ring and ground lines from the integrated coin acceptor to the telephone chassis. In addition, a 14-pin cable 57 connected to the integrated coin acceptor plugs into the telephone chassis. The cable 57 supplies power and control signals between the telephone chassis and the integrated coin acceptor, and may be modified to interface with the circuitry of various dumb or smart chassis.

When the integrated coin acceptor 30 is retrofit into an existing payphone with a dumb chassis, the tip 6, ring 8 and ground 9 lines are connected directly to the connector 47 and an installer uses test button 42 to initialize and test the audit functions. For example, the installer lifts the handset 10 off-hook and dials a preset number for the central office. A set-up protocol routine is then launched for the audit circuitry of the integrated coin acceptor. When the set-up routine is finished, the installer depresses the test button and hangs-up the handset. The audit function then executes, and at least one of the LED's 44, 46 will illuminate to indicate that the audit operation is taking place. When audit initialization ends, one or both LED's will illuminate for a preset time and then extinguish to indicate to the installer that the audit routine was successful.

Figure 3B:
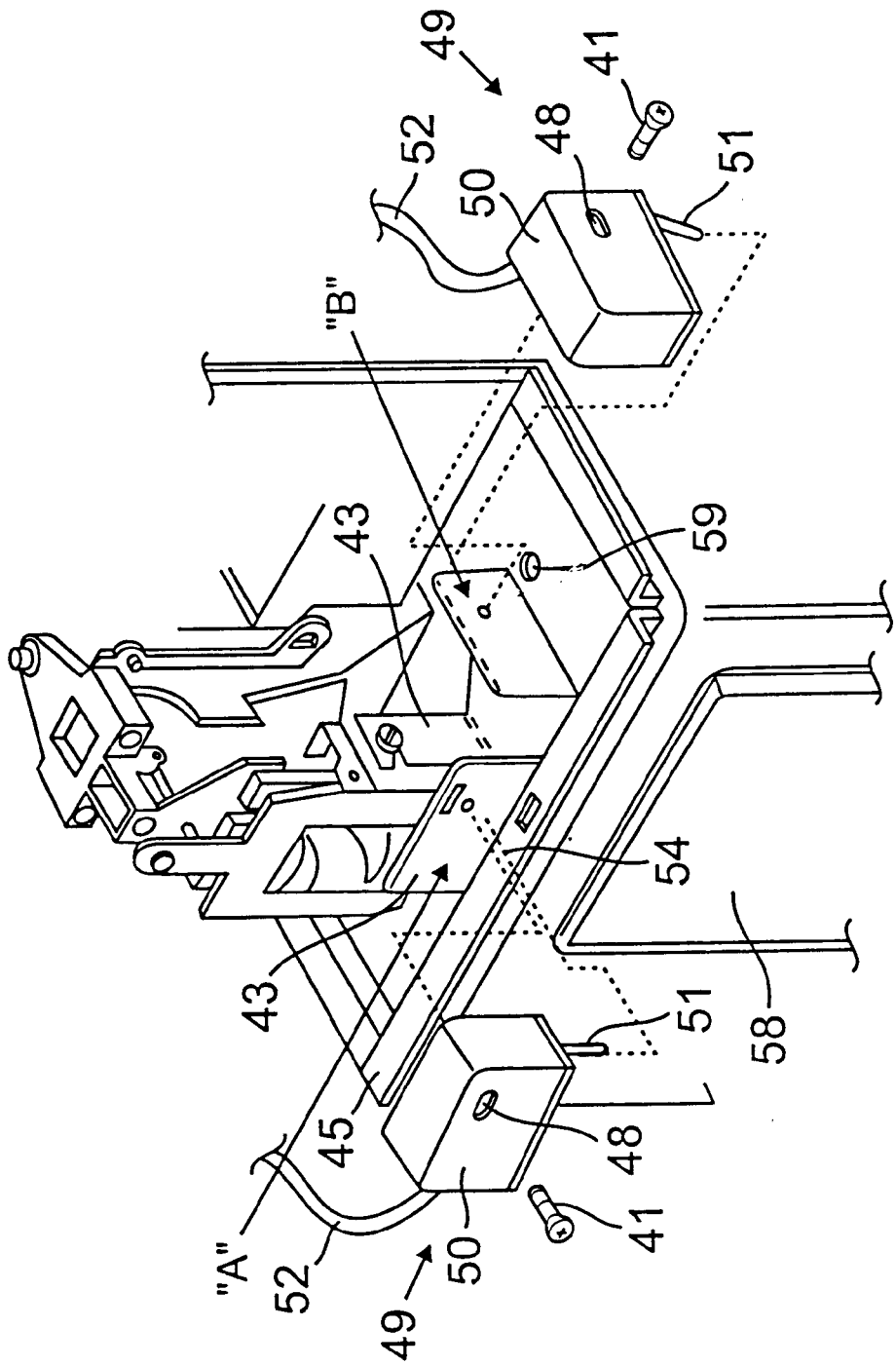
FIG. 3B is a partial, cutaway perspective view of the upper housing of a telephone chassis to illustrate two possible mounting positions for a security switch.

FIG. 3B is a partial, cutaway perspective view of the lower housing of a telephone chassis 45 to illustrate two of the possible mounting positions, "A" and "B", for the security switch 49 of FIG. 3A. A mounting screw or other connection means 41 passes through a mounting cutout 48 of the collar housing to attach it to a bracket 43. The bracket 43 is capable of attachment to at least two pre-existing cutouts in the payphone chassis. In position "A", the plunger 51 fits through an existing square hole 54 in the front of the lower housing of the telephone chassis 45 to monitor the vault door 58 of the payphone. If the telephone chassis has been damaged due to vandalism such that the square hole 54 is deformed, the bracket 43 can be mounted in position "B" so that the plunger 51 will align with an existing round hole 59 toward the rear of the chassis as shown. In this configuration, the security switch 49 monitors the coin box (not shown) within the payphone. The security switch 49 is easy to install, and does not require any drilling of holes into the lower housing of the telephone chassis 45. If the vault door is opened or the coin box removed, the switch 49 sends a signal to the audit circuitry of the integrated coin acceptor 30. Thus, the security switch 49 monitors a physical event, namely the removal of the cashbox.

Figure 4:
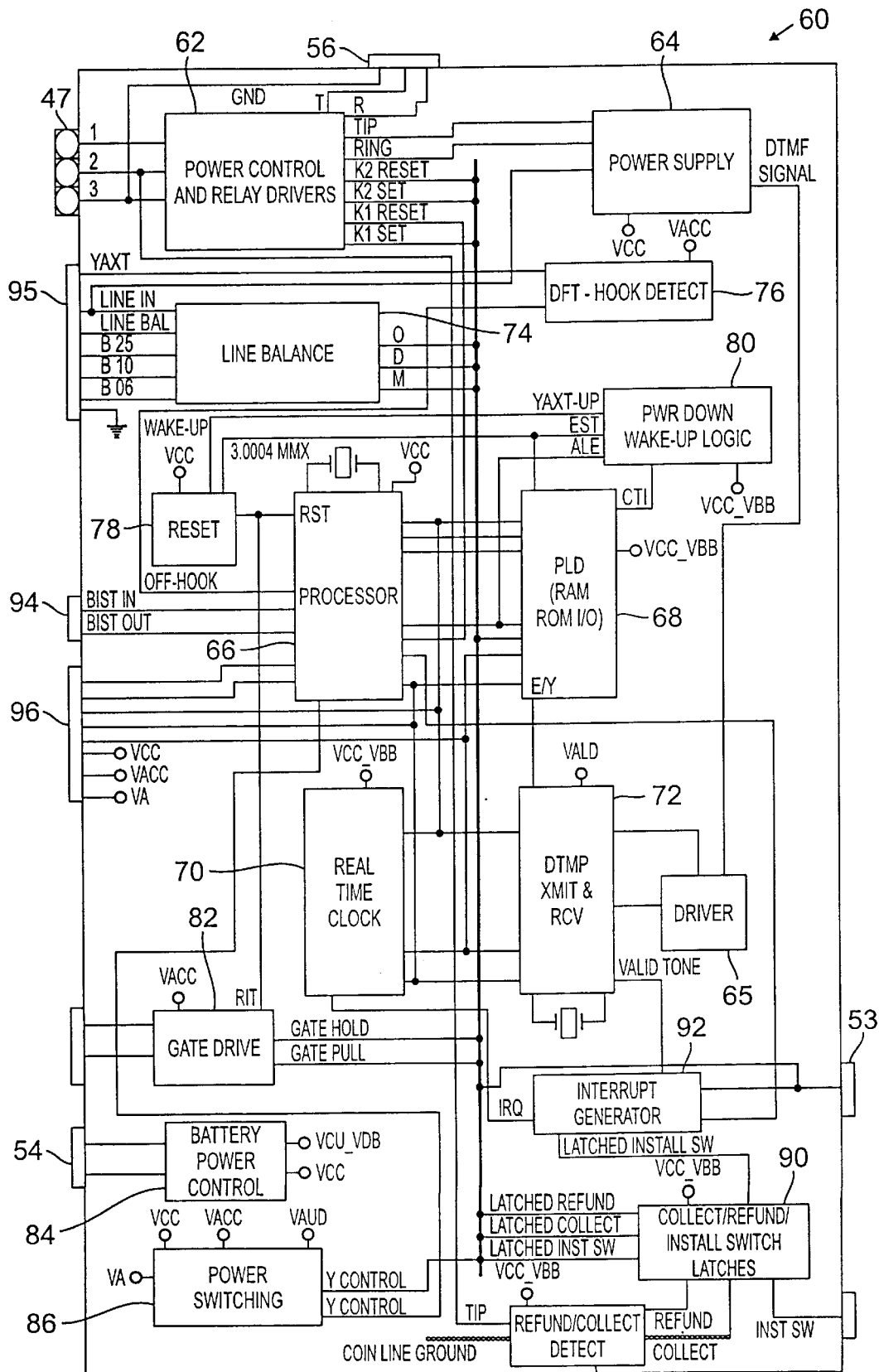
FIG. 4 is a simplified schematic block diagram of an embodiment of a control board.

FIG. 4 is a simplified schematic block diagram of an embodiment of a control board 60 containing the electronic circuitry of the integrated coin acceptor 30 of FIG. 3. The tip 6, ring 8 and ground lines 9 attach to the connector 47 and connect to the power control and relay drivers 62, power supply 64 and driver 65. The power control and relay drivers 62 are also connected to the connector 56, which is used to count the ground, tip and ring lines to the telephone chassis. A microprocessor 66, programmable logic device (PLD) circuitry 68, real time clock 70, and DTMF circuit 72 are connected together via standard data bus lines as shown. The DTMF circuit 72 is a transceiver, capable of both transmitting and receiving DTMF tone signals. Also contained on the board 60 are line balance and coin credit circuitry 74, an off-hook detect circuit 76, a reset circuit 78, power down and wake-up circuitry 80, a gate driver 82, a battery power control circuit 84 connected to a connector 54, a power switching circuit 86, a refund and collect detection circuit 88, collect/refund/install switch latch circuitry 90, and an interrupt generator 92. In addition, the coin box switch connector 53, battery connection 54, built-in self-test connection 94, harness connector 95 and a coin recognition board connector 96 (see FIG. 5) are shown.

A suitable microprocessor 66 for use in the integrated coin acceptor 30 is an 8-bit 80L31 microcontroller, which utilizes 3 volts to operate, contains 256 bytes of internal RAM, 16K of ROM or EPROM and has a maximum clock speed of 20 MHz. The microprocessor 66 performs the following tasks: coin validation, coin acceptance, chassis interface functions, coin audit, built-in self-test (BIST) interface functions, communications software interface functions with the central office, and power management functions. Audit events that are monitored and recorded include, but are not limited to, activation of the vault door switch or cash box removed, collect/refund occurrences, installation switch activation, occurrences of certain DTMF tones on tip and ring lines, credit for validated coins, and real time clock alarms. Examples of when the microprocessor initiates an audit call to the central office include, but are not limited to, when there is a coin box removed alarm, a collection event, a scheduled report, or when a test call is required.

The integrated coin acceptor 30 monitors all events that occur during an open-switch interval (OSI), which are line power interruptions that may last for 3 or more seconds, and maintains all critical information in battery-powered memory. OSI's occur from time to time in response to certain events such as user interaction, or an initial rate check, collect and refund occurrences and other events. In particular, the PLD circuitry 68 includes random-access memory (RAM) which is separate or external to the microprocessor 66, and is backed-up with battery power. The external RAM contains the audit data and coin acceptance parameters and is always powered so that, in the event of loss of telephone line power, all critical data including audit data will be preserved. Since the critical information already resides in external RAM, when an OSI is detected there is no need to move data into memory. In contrast, prior art auditors attempt to save critical audit data as power is being removed, thus risking audit information corruption or loss.

The microprocessor 66 also is capable of entering a "power down" mode of operation when no instruction is being executed which eliminates bus activity. If an OSI occurs during this time, it is transparent to the integrated coin acceptor 30, and nothing need be done. However, if the microprocessor is executing instructions and an OSI occurs, then steps are taken to enter a sleep mode of operation. In particular, the microprocessor has a power fail input that is monitored periodically to assure that ample power is available to enable proper program execution. An active power fail input indicates power has been removed and that a maximum of 17 msecs of power is left. At such time, the microprocessor suspends all activity and enters a sleep mode, to reduce the power requirements of the system and end bus activity. An internal timer of the microprocessor is used to interrupt the sleep mode at 1 msec intervals to check the power fail input. This sampling of the power fail input continues until power is depleted from the control board capacitor or the return of power is detected. Upon detection that normal power has returned, the microprocessor continues processing at the point it left off.

The power switching circuit 86 generates all of the voltages required to run the various functions of the control board. The tip 6, ring 8 and ground 9 connections are switched through to the telephone chassis by the power control circuit 62 depending on the logical condition of the coin acceptor 30. Power from the chassis during normal coin chute mode, which is when a user lifts the handset off-hook so that power is derived from the tip and ring lines, is input at connector 95 where the harness cable 57 (see FIG. 3) connects.

The integrated coin acceptor 30 may contain a built-in self-test (BIST) function. The data interface lines are attached to connector 94 of the integrated coin acceptor and to a personal computer. Service personnel use the personal computer and BIST function to test the integrated coin acceptor before shipment to a customer.

Figure 5:
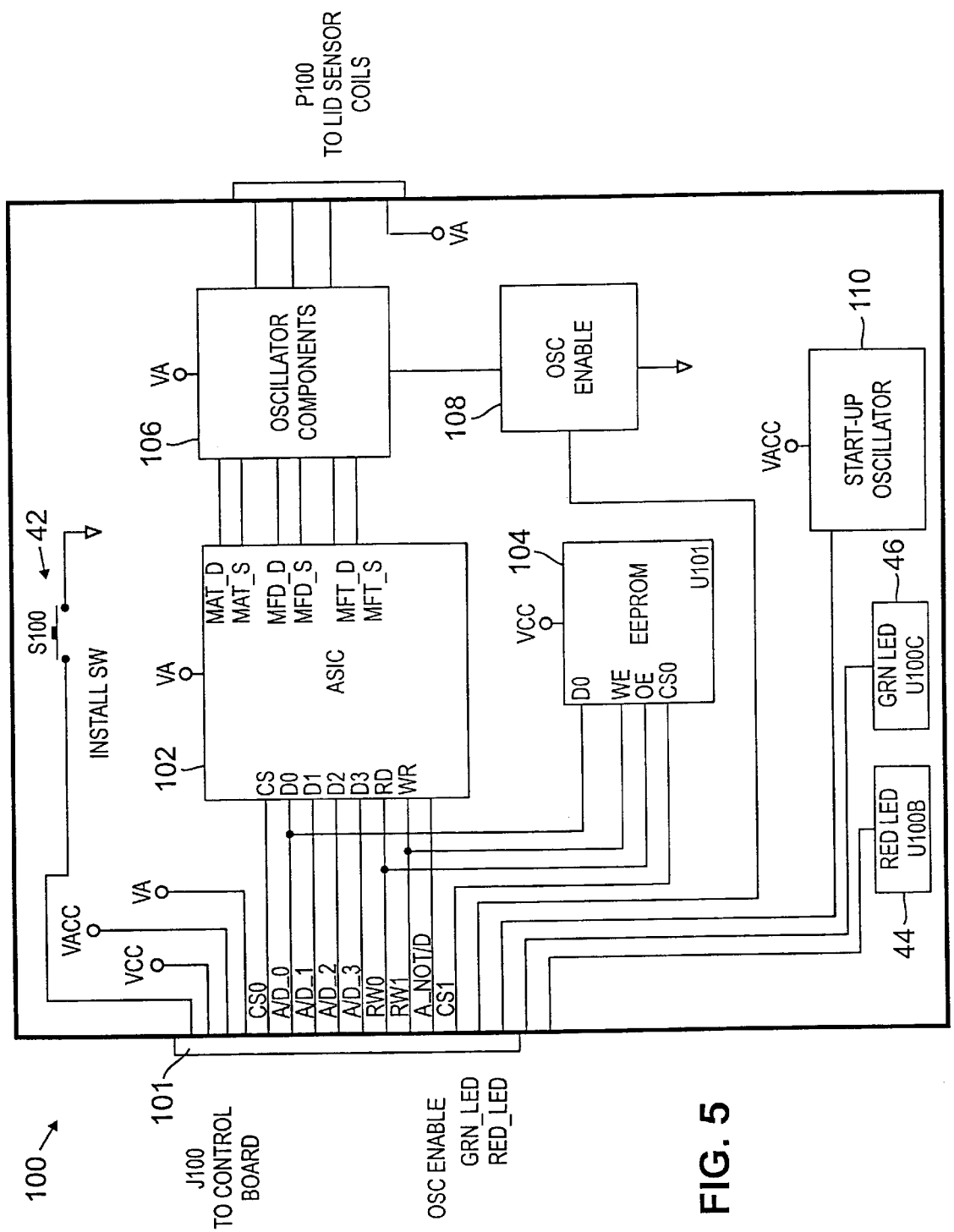
FIG. 5 is a simplified schematic block diagram of a coin recognition board.

FIG. 5 is a simplified schematic block diagram of a coin recognition board 100. A connector 101 is used to interface the coin recognition board 100 to the control board 60 at connector 96 (see FIG. 4). The board 100 includes an application specific integrated circuit (ASIC) 102, EEPROM circuit 104, LED's 44, 46 which may be green and red, test button 42, oscillator components 106, an oscillator enable circuit 108 and a wake-up oscillator circuit 110. The ASIC 102 receives input from the oscillator components 106 which are connected to the sensors in the coin passageway, and generates coin characteristic data that are utilized by the microprocessor 66 on the control board 60 to validate coins.

When a payphone user picks up the handset, the microprocessor 66 enters the coin chute mode of operation. During coin chute mode, credit signals are issued on the nickel, dime, and quarter interface lines depending on the coin accepted. In addition, the microprocessor controls the relay utilized for connecting the tip and ring lines to the telephone chassis, and switches the line balance circuitry during coin validation and tone generation. Tone generation is typically handled by the chassis. The coin credit data is monitored and stored in external random access memory (RAM), which is backed-up by the battery, so that it can be transmitted at a later time to the host computer at the central office. The audit data is transmitted in a format defined by the central office.

The audit mode of operation is defined as that time when the integrated coin acceptor 30 has control of the tip 6 and ring 8 lines. When the handset is on-hook and the integrated coin acceptor enters audit mode, power is derived from the tip and ring lines. In audit mode, the microprocessor 66 establishes two-way communication with the central office via the DTMF circuit 72. Such communication occurs at time of installation, after an alarm from the real time clock 70 for a timed event, or when a physical event occurs involving removing the coin box or opening the vault door. The circuitry of the integrated coin acceptor 30 associated with audit functions includes the DTMF circuit 72, the static RAM memory in the PLD circuit 68, EEPROM memory 104, real time clock 70, battery and control circuitry 84, and the power control and relay drivers 62 that interface to the tip and ring lines.

Power management for different operations are divided into several different modes by the integrated coin acceptor 30. For example, when the handset is on-hook and there is no activity then substantially no power is consumed. During audit mode, the microcontroller 66, audit circuitry and PLD circuit 68 are active and consume less than 20 mA. When the handset goes off-hook and the coin acceptor is waiting for coin arrival, the start-up oscillator 110 consumes less than 1 mA. When a coin is deposited and is being validated about 6 mA is consumed. Next, if the coin is accepted the accept gate 38 is moved and approximately 15 mA is consumed, and during coin tone generation about 2.5 mA is consumed. Thus, peak power is consumed when a user deposits coins causing the accept gate 38 to operate and coin credit tones are generated on the tip and ring lines.

Figure 6A:
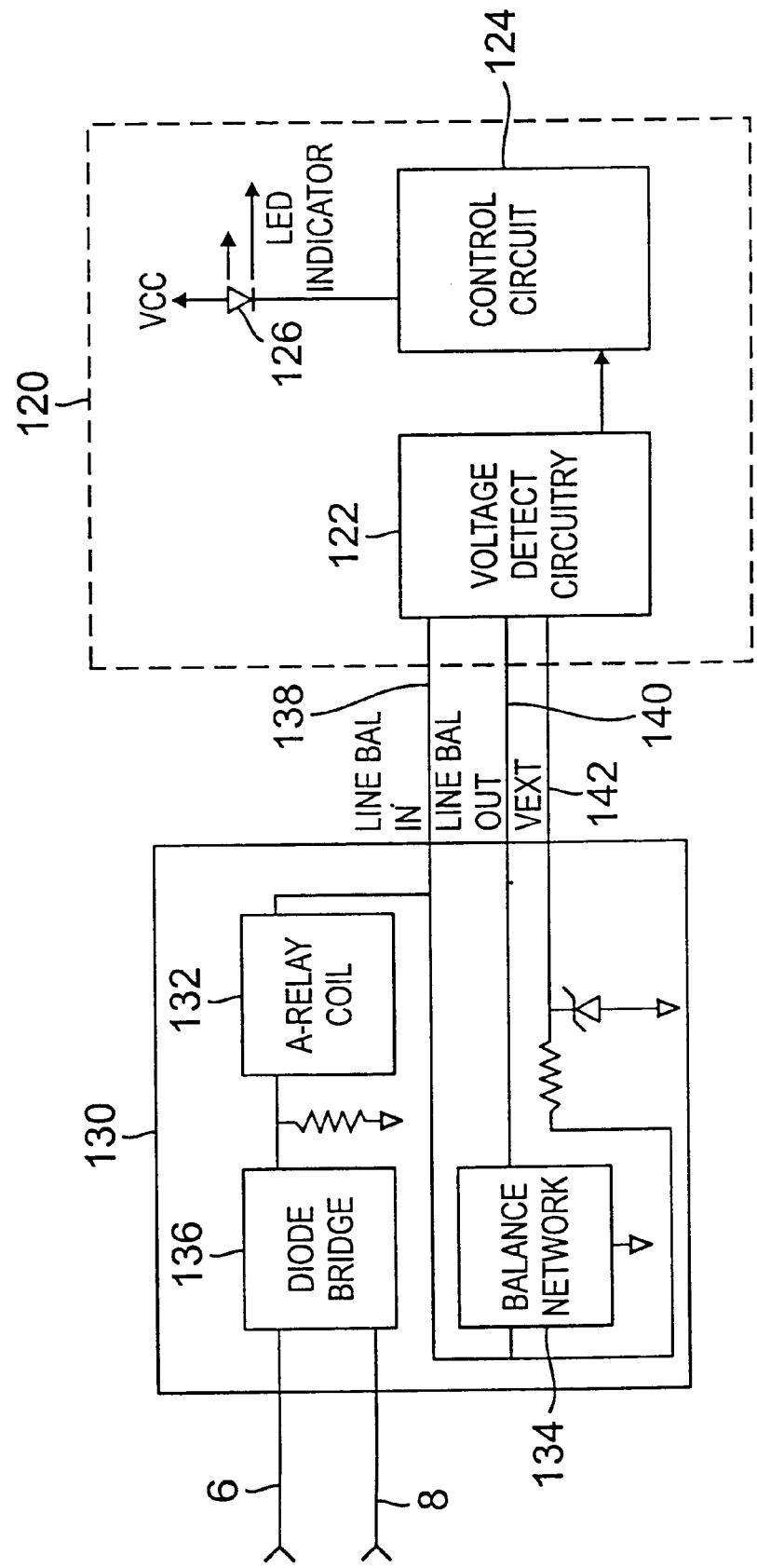
FIGS. 6A, 6B and 6C are schematic block diagrams of telephone power detection circuits.
Figure 6B:
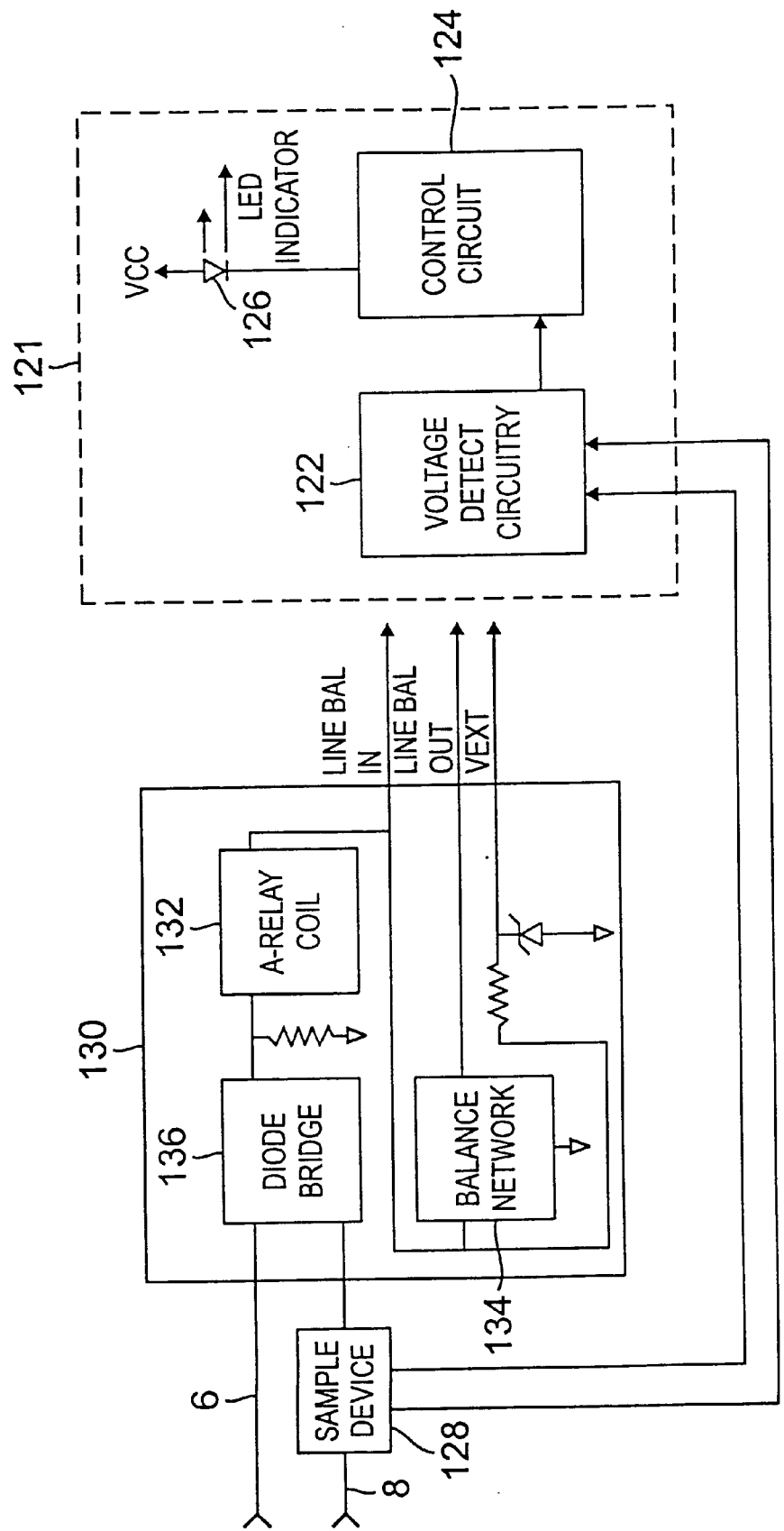
Figure 6C:
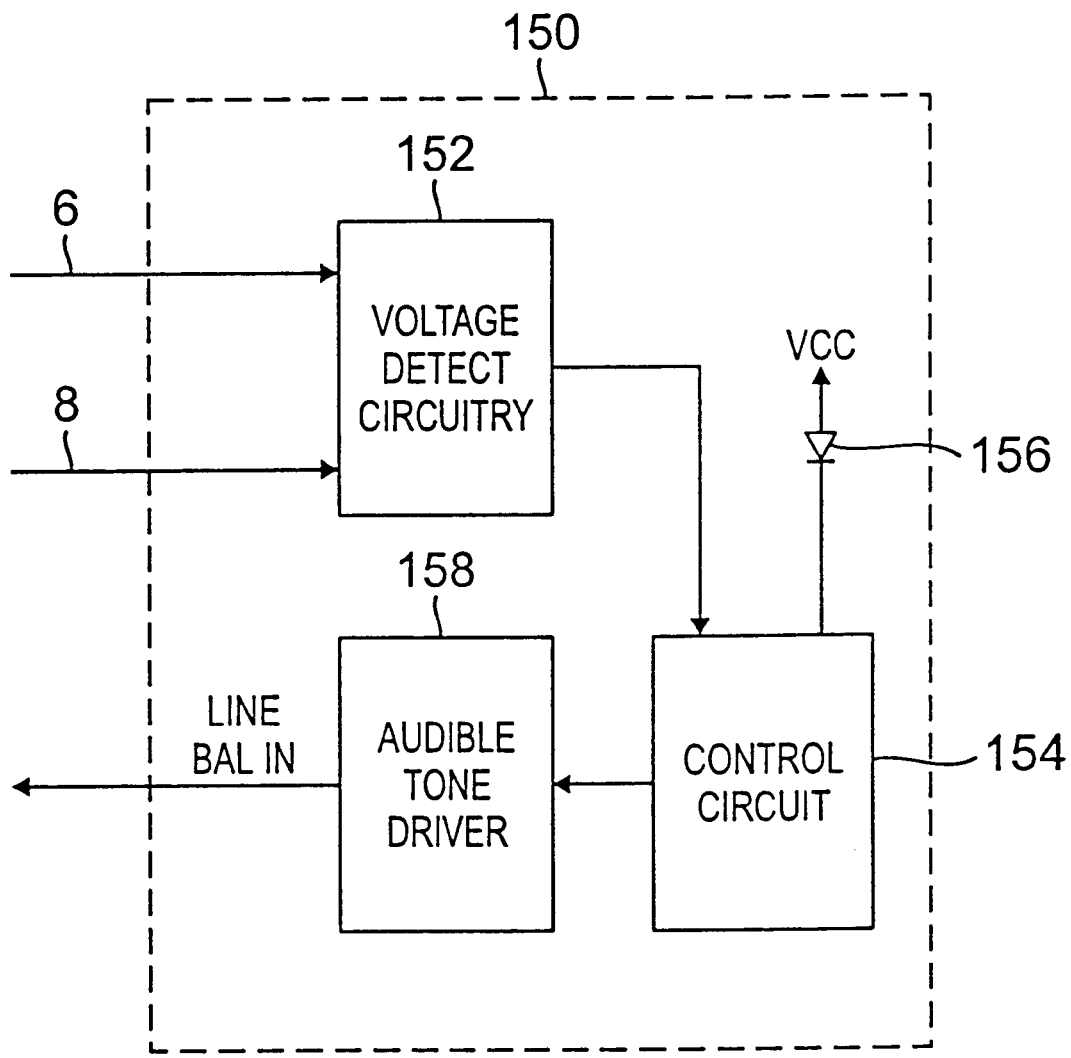

FIGS. 6A, 6B and 6C are simplified schematic block diagrams illustrating different circuit configurations for detecting and indicating if enough power (at least 23 mA) is available from the central office to properly operate the coin operated telephone in the system. It should be understood that the circuits of FIGS. 6A, 6B and 6C could be part of the integrated coin acceptor 30, or may be separately added to existing dumb or smart telephones. Each of the circuits measures power conditions which can be sampled at several locations, including the tip and ring lines, or Line Balance lines, the $V_{external}$ line, or a combination of Line Balance lines and the $V_{external}$ line. Each circuit includes a microprocessor with an associated power detect program or other logic control circuitry, and means to indicate the power condition to service personnel either visually or audibly. The microprocessor may be the same microprocessor 66 on the control board 60 of the integrated coin acceptor 30, or may be a separate unit.

FIG. 6A is a simplified schematic diagram of a loop length indicator circuit 120 that may be installed in a payphone. A voltage detect circuit 122 is connected to an A-relay coil 132 and balance network 134 contained in a payphone chassis 130. The payphone chassis 130 may house a dumb set or a smart set, and has the tip 6 and ring 8 lines connected to it. The diode bridge 136, A-relay coil 132 and balance network 134 generate signals on the Line Balance In line 138, Line Balance Out Line 140 and $V_{external}$ 142 line. The balance network 134 is generally considered a voltage source and maintains a relatively constant impedance between the tip and ring lines by shunting current to ground as required. The Line Balance In line 138 is the high side in terms of voltage of the balance network 134, and the Line Balance Out line 140 is the low side in terms of voltage, with current flowing back out to the chassis 130 through the Line Balance Out line when needed. Line Balance In is connected to Line Balance Out via a switch and a 33 ohm resistor (not shown), except when the accept gate is energized and then the 250 ohms of the gate resistance is substituted for the switch, in series with the 33 ohm resistor. The $V_{external}$ line 142 is derived from the Line Balance In line and is best modeled as a zener diode voltage source connected to ground on one end, and as a resistor to the Line Balance Out line on the other end as shown.

The voltage level present on the Line Balance In line 138 is proportional to the loop current as the Balance Network 134 automatically adjusts the load impedance for various loop lengths. The voltage on Line Balance In line 138 is interpreted by the Voltage Detect Circuitry 122 which signals the control logic circuit 124 if less than the minimum loop current is detected. The control circuit 124 then activates either a visual warning indicator such as an LED 126, or an audible alarm circuit or both. The visual warning indicator may be one or both of the LED's 44, 46 shown in FIG. 3A. Alternately, a tone or an interference signal may be injected into the earpiece 11 of handset 10 (see FIG. 1) via the Line Balance Out line 140.

Again referring to FIG. 6A, instead of monitoring the Line Balance In line 138, the Voltage Detect circuitry 122 could monitor the voltage on the $V_{external}$ line 142. In particular, the voltage on the $V_{external}$ line 142 is in regulation when sufficient loop current of 23 mA or more exists. As loop current drops, $V_{external}$ no longer stays in regulation, indicating a fault. The voltage on the $V_{external}$ line 142 is then interpreted by the Voltage Detect Circuitry 122, which signals the control circuit 124 if less than minimum loop current is detected. The control circuit then activates either a visual warning indicator or other indication means, as discussed above.

Alternately, the indicator circuit 120 of FIG. 6A may measure the current flowing from the Line Balance In line 138 to the Line Balance Out line 140, which is converted to a representative voltage by the 33 ohm resistor. The voltage across the resistor is then interpreted by the Voltage Detect Circuitry 122, which signals the control circuit if less than minimum loop current is detected. A visual warning indicator such as an LED, or other indication means, is then activated as discussed above.

FIG. 6B is a simplified schematic diagram of a loop length indicator circuit 121 incorporating voltage detect circuitry 122, a control circuit 124, an LED indicator 126 and a sampling device 128. The sampling device 128 is shown in series with the ring line 8 but may be in series with the tip line 6, and senses the current on the line. The output of the sampling device is interpreted by the Voltage Detect Circuitry 122, which signals the control circuit if less than minimum loop current is detected. The control circuit then activates a visual warning indicator such as the LED 126, or an audible alarm circuit or both. Alternately, a tone or an interference signal may be injected into earpiece 11 of the handset 10.

FIG. 6C is a simplified schematic diagram of a loop length indicator circuit 150 that would be connected directly to the tip 6 and ring 8 lines of the telephone system. The voltage measured tip to ring when the telephone is in the off-hook state is proportional to the loop current flowing, and thus the voltage detect circuit 152 is designed to be capable of surviving high voltage transients. The voltage between the tip and ring lines is interpreted by the voltage detect circuit 152 which signals the control circuit 154 if less than minimum loop current is detected. The control circuit 154 then activates either a visual warning indicator such as the LED 156, or activates an audible tone driver circuit 158 to inject a tone or an interference signal into the earpiece 11 of the handset 10 via the Line Balance In line, or otherwise provides an indication for a serviceman.

Figure 7:
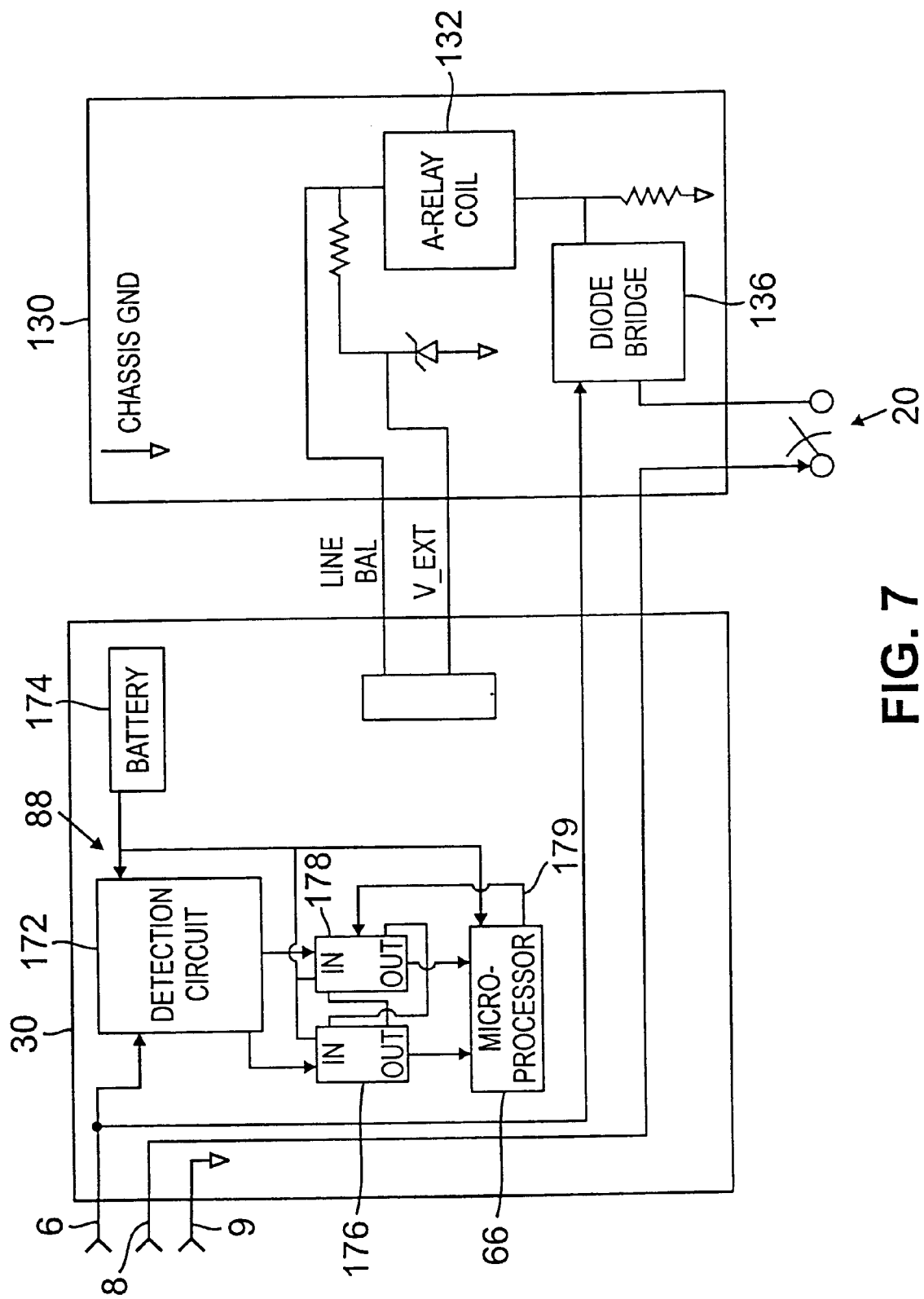
FIG. 7 is a schematic block diagram of a collect or refund detection circuit.

FIG. 7 is a simplified schematic block diagram of a collect/refund detection circuitry 88 that detects and stores collect and refund information while the telephone is on-hook, consuming substantially no power from the telephone line. The circuit 88 may be part of the integrated coin acceptor 30, or may be part of a separate auditor circuit for attachment to either a smart or dumb telephone chassis. Referring to FIG. 7, the tip line 6 is connected to a detection circuit 172 which is connected to a battery 174. The battery and the detection circuit are also connected to two latches, 176 and 178, which are connected together in a bistable configuration, and the latches and battery are connected to a control circuit 66 or microprocessor.

When a user hangs up the handset after a call, the telephone hook switch 20 is open as shown in FIG. 7, and the central office performs either a collect or refund operation. The central office removes tip to ring power and applies tip to ground power to cause the escrow bucket in the telephone chassis 130 to operate. Typically, a tip to ground current of 41 mA or greater for a period of 350 msecs or greater indicates coin disposal, wherein a positive polarity signal indicates coin collection and a negative polarity signal indicates a refund. During this time, there is no tip to ring power but the audit information is important and must be recorded. Thus, the detection circuitry 88 performs the detection and information retention function as follows. When a collect or positive signal of 41 mA lasting 350 msecs or more is detected by the battery-powered detection circuit 172, it sends a signal to set latch 176. Similarly, if a refund or negative signal of the same strength is detected, then a signal is sent to set latch 178. Once one of the latches is set the other latch is locked out until a reset signal on line 179 from the control circuit 66 resets the latches. Thus, a collect or refund event is captured without using any power from the tip and ring lines, and by using minimal power from the battery 174.

When a user removes the handset to go off-hook, or if an audit event occurs, tip and ring power is restored and the circuitry of the integrated coin-acceptor 30 wakes up. The state of the latches 176 and 178 is then checked by the control circuit 66, and if latch 176 has been set, then the coin count stored in memory is updated. The control circuit 66 next issues a reset signal on line 179 to reset both latches in preparation for new information that may be generated after the user hangs up.

Figure 8:
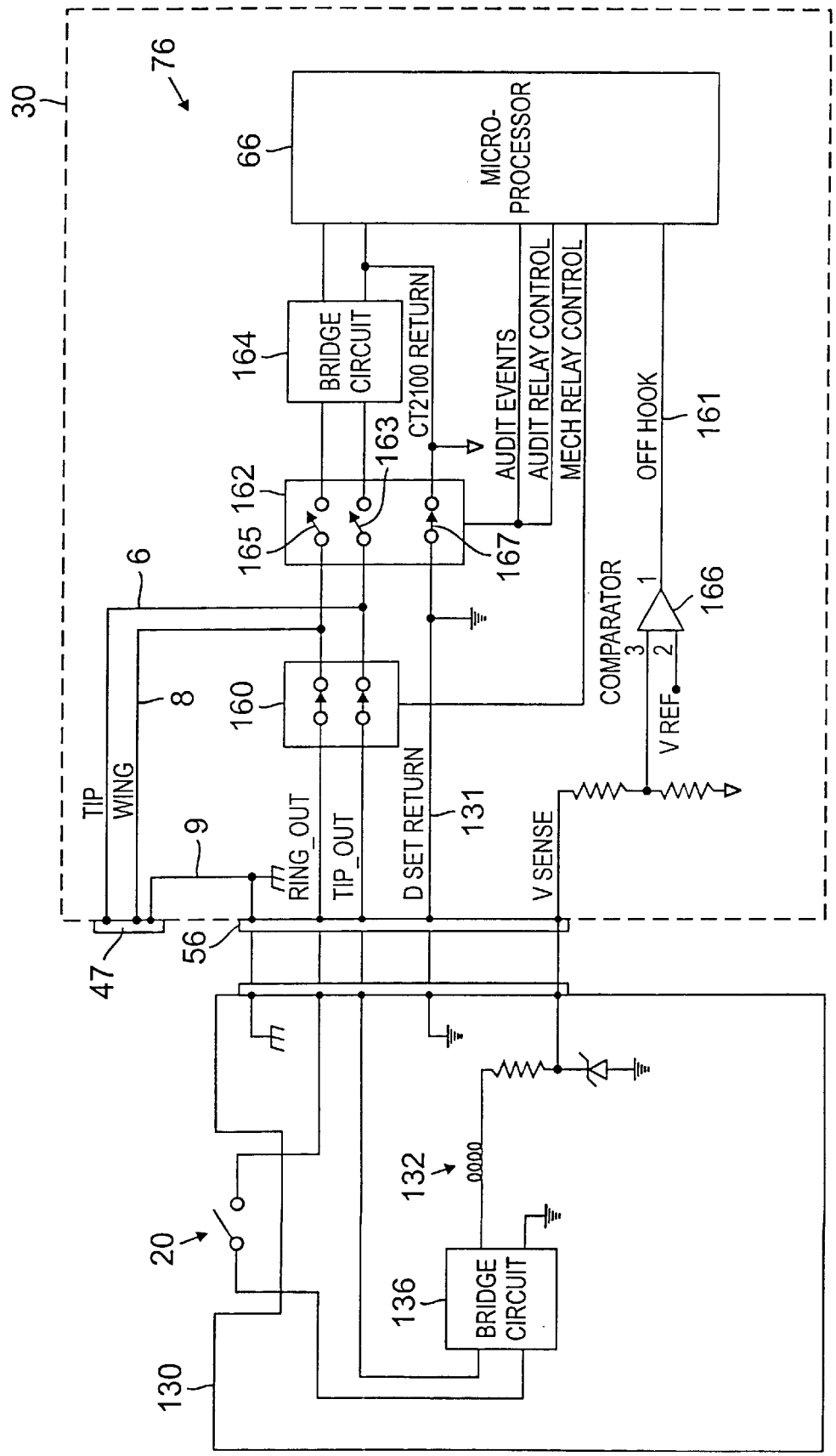
FIG. 8 is a schematic block diagram of an off-hook detection circuit.

FIG. 8 is a simplified schematic block diagram depicting the off-hook detection circuit 76 (also shown in FIG. 4) of the integrated coin acceptor 30. The detection circuit 76 may be telephone line or battery powered. In addition, one skilled in the art understands that the off-hook detection circuit 76 could be added to an existing telephone auditor or other stand-alone circuitry.

The off-hook detection circuit of FIG. 8 functions to detect when the handset 10 is removed from the cradle 19 (see FIG. 1) during the time that the integrated coin acceptor is in audit mode. This is an important event because, when the telephone goes off-hook during audit mode, the dial tone must be provided to the user and steps must be taken to prevent corruption of the audit information that was being transmitted to the central office.

Referring to FIG. 8, tip 6, ring 8 and ground 9 lines from the central office come directly into the integrated coin acceptor 30. The tip and ring lines are connected to the telephone chassis 130 through a mechanical relay 160 or similar control device. The ground line is connected to the connector 47 and directly to the connector 56. During normal operation of the payphone, the switches of the relay 160 are closed, the switches 163 and 165 of the audit relay 162 are open, and the switch 167 is closed. Thus, the ground line 131 between the chassis and the integrated coin acceptor is normally connected. When the handset 10 is on-hook, the hook switch 20 is opened, as shown. When a user wishes to place a call, the handset is lifted from its cradle causing the hook switch 20 to close, and the central office provides a dial tone.

When the integrated coin acceptor 30 enters audit mode with the handset on-hook, then the audit relay 162 is energized so that the switches 163 and 165 close to connect the tip and ring lines through the bridge circuit 164 to the microprocessor 66. The central office then supplies a dial tone as the coin acceptor 30 powers up using the voltage supplied through the audit relay 162. (The audit relay 162 is battery-powered and is part of the power control circuitry 62 shown in FIG. 4.) The microprocessor 66 recognizes an audit event and causes a pre-programmed telephone number stored in battery backed-up memory to be dialed so that audit information can be reported. Once dialing begins, the, central office removes the dial tone. Therefore, if a user now tries to place a telephone call by picking up the handset during audit communications, unless steps are taken to quickly terminate the audit mode and return dial tone, she may hear the audit transmission and will not be able to make a call.

During an audit mode call-in-progress, the audit relay 162 is acting as the hook switch and switches 163 and 165 are closed to provide power to the integrated coin acceptor 30, but switch 167 is open to disconnect the ground line 131 between the chassis and coin acceptor. When the handset is taken off-hook, the hook switch 20 closes causing a voltage to be generated by bridge circuit 136. The A-relay coil 132 is then energized to send a signal $v_{sense}$ to comparator 166 which generates an off-hook signal 161 input to microprocessor 66. This off-hook signal is recognized by the microprocessor as a request for dial tone, and the microprocessor generates an OSI sequence by utilizing the mechanical relay 160 and audit relay 162. In particular, upon encountering the off-hook signal the microprocessor energizes the mechanical relay 160 to open its switches to isolate the chassis 130 from the tip and ring lines. The audit call in progress is then rescheduled to a future time and an OSI time interval of at least 3 seconds is programmed to the real time clock 70 (shown in FIG. 4) to guarantee that a new dial tone will be generated by the central office. The audit relay 162 is then energized to open its switches to isolate the integrated coin acceptor 30 from the tip and ring lines, resulting in an open loop condition. When the OSI time interval of at least 3 seconds elapses, the audit relay 162 is energized to connect the tip and ring lines, causing the integrated coin acceptor 30 to power on with a new dial tone. As this occurs, the microprocessor 66 recognizes that the dial tone resulted from a self-initiated OSI, and causes the mechanical relay 160 to close and the audit relay 162 to open. Consequently, the dial tone is returned to the chassis handset to complete the OSI sequence and to permit a user to place a telephone call.

Consequently, when a user picks up the handset to close hook switch 20 during audit mode, the off-hook detection circuit 76 senses a change in the voltage between the chassis 130 and the integrated coin acceptor 30 rather than directly monitoring the state of the hook switch 20. The microprocessor 66 then proceeds with an open switch interval (OSI) sequence, as explained above. The audit information is further protected by proceeding in this manner because when an OSI occurs the tip 6 and ring 9 lines are disconnected from the chassis which removes power and disables the payphone keypad 14 (see FIG. 1). This prevents a telephone user from unintentionally corrupting the audit data by inserting additional DTMF tones from the keypad into the audit information.

If an off-hook event is detected during audit mode but before the integrated coin acceptor 30 dials the central office, the audit event is rescheduled using the real time clock 70 and the audit relay 162 is opened. Thus, the current dial tone that was going to be provided to the microprocessor by the audit relay 162 for audit purposes is merely re-routed through the mechanical relay 160 to the handset 10 to enable a user to place a telephone call.

An integrated coin acceptor for a payphone that contains audit circuitry and functions has been described. The integrated coin acceptor is fully compatible with the audit software used by the central office, and is designed to assure a seamless transition between coin acceptor operation and audit data recording and transmission. Components related to the audit function include a DTMF transceiver, static RAM memory, EEPROM memory, real time clock, battery and control circuits for data retention, and a interface circuitry to the tip, ring, and ground lines. Several other components and circuits, including a cashbox security switch for mounting into an existing hole in the telephone chassis housing, and a simple interface circuit to aid in initializing the audit functions and for checking the telephone line power availability have been disclosed. During audit interrogation activity, the integrated coin acceptor takes control of the phone line, but contains circuitry that returns the dial-tone to the user if an off-hook event occurs. Thus, the described low-power, integrated coin acceptor is a low cost solution for providing improved coin validation and audit functions for a dumb payphone chassis or to a smart payphone chassis.

What is claimed is:

1. A loop length indicator circuit incorporated within a coin operated telephone for indicating that less than a minimum loop current is available, comprising:

monitor means for measuring power conditions and for providing a first signal indicative of the power available from the central office;

control means connected to the monitor means for processing the first signal and generating a second signal if inadequate power is available; and indicator means connected to the control means for providing an alerting indication to service personnel at the payphone if the second sign is generated.

2. The circuit of claim 1, further comprising:
   a sampling device connected to the tip and ring lines and to the monitor means.

3. The circuit of claim 1, wherein the monitor means is a voltage detect circuit.

4. The circuit of claim 1, wherein the indicator means is a light emitting diode (LED).

5. The circuit of claim 1, wherein the indicator means is an audible tone driver for injecting an alerting signal into an earpiece of the telephone.

6. The circuit of claim 1, wherein the indicator means is an audible alarm.

7. A method for indicating that less than a minimum loop current is available from the telephone lines to power the circuits of a coin operated telephone, comprising:

testing the amount of current available from the telephone lines with circuitry incorporated within the coin operated telephone; and energizing at least one warning indicator at the telephone to alert service personnel if the telephone line power is less than the minimum loop current.

8. The method of claim 7, wherein the step of energizing an indicator comprises illuminating a light emitting diode.

9. The method of claim 7, wherein the step of energizing an indicator comprises powering an audible alarm.

10. The method of claim 7, wherein the step of energizing an indicator comprises injecting an alerting signal into the earpiece of the telephone.

11. A loop length indicator circuit incorporated within a coin operated telephone, for indicating that less than a minimum loop current is available, comprising:

a sampling device connected to either of the tip and ring lines to sense the loop current and having a sampling output;

a voltage detect circuit connected to the sampling output and to circuitry in the chassis of the telephone, the voltage detect circuit monitoring the sampling output and generating a signal when the loop current is inadequate to power the telephone;

control means connected to the voltage detect circuit for processing the signal; and indicator means connected to the control means for providing an alerting indication of inadequate power.

12. A loop length indicator circuit incorporated within a coin operated telephone, for indicating that less than a minimum loop current is available, comprising:

a voltage detect circuit connected to the tip and ring lines of the telephone system, the voltage detect circuit monitoring a voltage condition of the lines when the telephone is off-hook and generating a signal when the voltage level indicates that the loop current is inadequate to power the telephone;

control means connected to the voltage detect circuit for processing the signal; and indicator means connected to the control means for providing an alerting indication if loop current is inadequate.

* * * * *